Figures 1, 2:
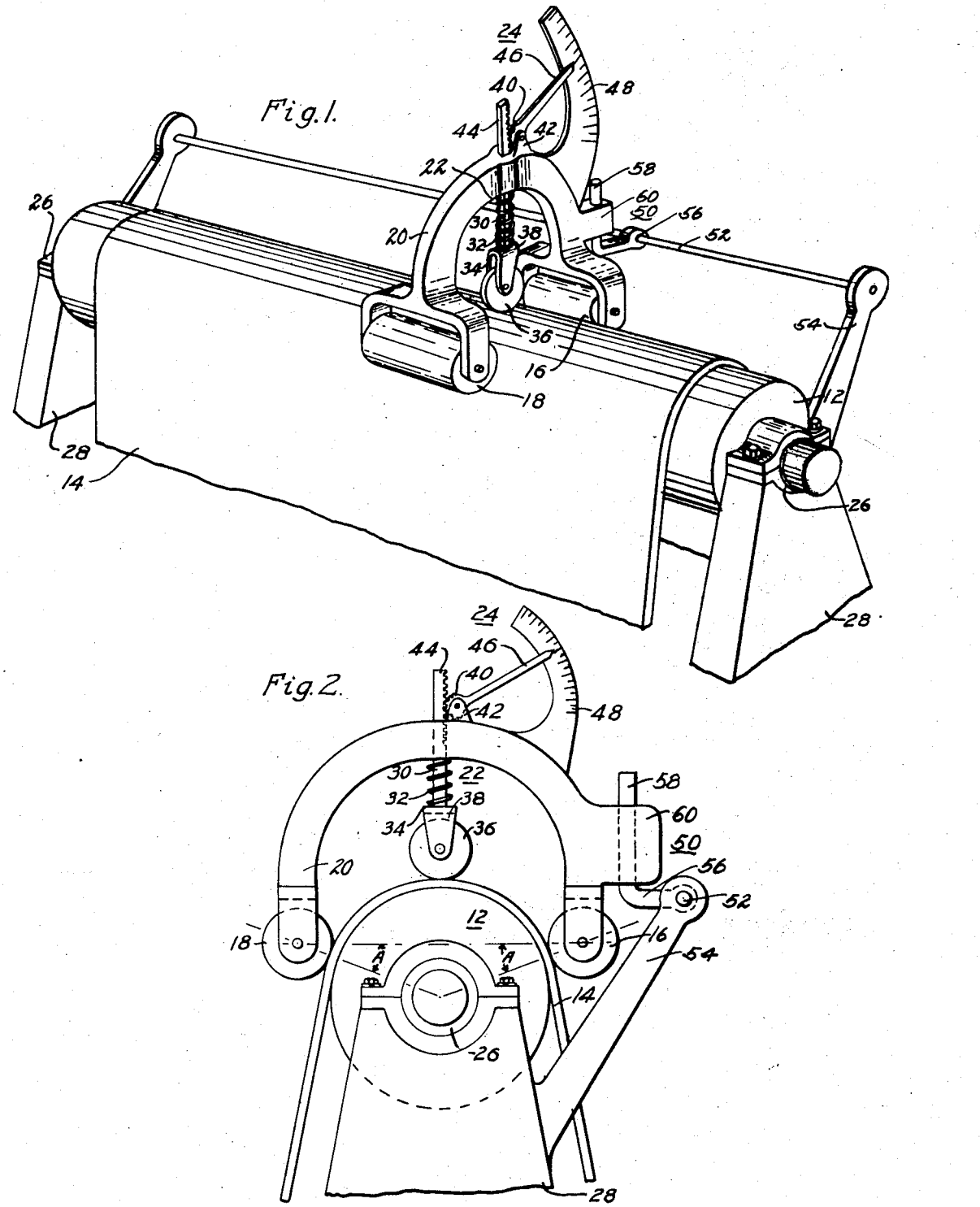

Dec. 10, 1940.    F. H. GULLIKSEN    2,224,728

THICKNESS GAUGE

Filed July 9, 1938

WITNESSES:
N. F. Susser.
Joe Weber

INVENTOR
Finn H. Gulliksen.
BY
G. M. Crawford
ATTORNEY

Patented Dec. 10, 1940

2,224,728

UNITED STATES PATENT OFFICE 2,224,728

THICKNESS GAUGE

Finn H. Gulliksen, Wilkinsburg, Pa., assignor to Westinghouse Electric & Manufacturing Company, East Pittsburgh, Pa., a corporation of Pennsylvania Application July 9, 1938, Serial No. 218,308

1 Claim. (Cl. 33—172)

My invention relates, generally, to thickness gauges and, more particularly, to a gauge for measuring the thickness of flexible strip material.

In carrying out manufacturing processes in which strip material is produced, it is necessary that the thickness of the strip be known so that the steps in the process may be controlled to produce a strip of uniform thickness. In the operation of steel strip rolling mills in which strips of great width are produced, it is necessary that the thickness of the strip throughout its width as well as throughout its length be measured accurately as it passes through the mill so that the various factors, such as tension and screw-down which control the thickness of the strip may be adjusted, if need be, to produce a strip of a desired uniform thickness throughout its length and width.

Instruments heretofore used for measuring the thickness of steel strip as it passes through the strip mill have been operable to measure the strip thickness at the edge of the strip but have not been operable to measure accurately the strip thickness at or near the center of the strip.

It is, therefore, an object of my invention to provide a thickness gauge which shall function to measure accurately the thickness of a strip of flexible material at any desired point throughout the entire width of the material while the material is in motion.

Another object of the invention is to provide a thickness gauge for flexible sheet material which shall function to measure accurately the thickness of the material at any desired point on the sheet.

A further object of the invention is to provide a thickness gauge for flexible strip material which shall function to measure accurately the thickness of steel strip at any desired point throughout the width of the strip as it moves through the reducing rolls.

A further object of the invention is to provide a thickness gauge for a sheet of material which shall have a small number of parts, and which shall be simple and efficient in operation and inexpensive to manufacture, install and maintain.

These and other objects and advantages of my invention will be apparent from the following detailed description taken in connection with the accompanying drawing, in which:

Figure 1 is a view in perspective of a preferred embodiment of my invention, and Fig. 2 is an end elevation view of the embodiment of the invention shown in Fig. 1.

Referring to the drawing, a cylindrical roller 12 is provided so that the strip 14 whose thickness is to be measured may pass over the roller 12. A pair of contact rollers 16 and 18 mounted on a frame or yoke 20 are disposed to engage the strip 14 as it passes over the roller 12 and a feeler element 22 is supported on the frame 20 and controls an indicator 24 which is graduated to indicate the thickness of the strip 14.

The roller 12 is suitably supported by bearings 26 on supporting elements 28 in such a position as to allow the strip 14 to pass over the roller 12 as it is being passed through a work device such as a paper mill, strip rolling mill or the like, not shown. The contact rollers 16 and 18 may be supported by suitable bearings in the ends of the arms of the frame 20 and the frame 20 and the contact rollers 16 and 18 are so dimensioned as to provide a spacing between the adjacent sides of the rollers 16 and 18 which is less than the diameter of the roller 12 plus twice the thickness of the strip 14. With such a spacing of the rollers 16 and 18, the rollers will never pass below the center line of the roller 12 and there will always be an angle A between the centers of the rollers 16 and 18 and the lines between the center of the roller 12 and the centers of the rollers 16 and 18.

The feeler element 22 comprises a stem member 30 which is slidably mounted in the frame 20, as shown, so that there may be relative movement between the frame 20 and the stem 30. The stem 30 is biased toward the line between the centers of the rollers 16 and 18 by a spring member 32 which bears upon the frame 20, as illustrated, and upon a shoulder 34 on the stem 30. A rotatable contact member 36, which may be a roller similar to rollers 16 and 18, is attached to the stem 30 by a suitable bifurcated member 38.

In order that the relative movement and displacement of the stem 30 and the frame 20 which are functions of the change in thickness and the thickness of the strip 14 may be known or indicated, the indicating device 24 is provided. The indicating device 24 comprises a pinion 40 which is rotatably mounted on the frame 20 by any suitable support 42 and cooperates with the rack 44 on the end of the stem 30, so that any relative movement between the stem 30 and the frame 20 will cause rotation of the pinion 40. A pointer 46 is mounted to be moved by the rotation of the pinion 40 and a scale 48 is mounted on the frame 20 in cooperative relation with the pointer 46. The scale 48 may be suitably graduated to indicate the thickness of the strip 14.

In the operation of the device as the strip 14 is passing over the roller 12, the frame 20 may be positioned upon the strip 14 at any point throughout the width of the strip 14 where it is desired to determine the thickness of the strip. When the frame 20 is so positioned that the rollers 16, 18 and 36 are in contact with the strip 14, the relative displacement of the frame 20 and the stem 30 will be determined by the thickness of the strip 14. It will be seen that an increase in thickness of the strip 14 which we will designate as T will cause the roller 36 and the stem 30 to be raised an amount T. The frame 20 and rollers 16 and 18, however, will be raised an amount which we will call V by the increase in thickness T. Then the relative movement between the stem 30 and the frame 20 which we will call M may be expressed $$M = V - T$$

now $$V = \frac{T}{\sin A}$$

therefore, $$M = \frac{T}{\sin A} - T$$

or $$M = T\left(\frac{1}{\sin A} - 1\right)$$

and the thickness of the strip may be expressed by the formula $$T = \frac{M}{\frac{1}{\sin A} - 1}$$

Thus it will be seen that it is only necessary to properly graduate the scale 48 to indicate the thickness of the strip as a function of the relative movement between the stem 30 and the frame 20.

The indicating device 24 may be so constructed as to introduce any desired multiplying factor so that very small changes in thickness of the strip may give large indications on the scale 48, thus increasing the sensitivity of the instrument. The sensitivity of the instrument will also vary with the angle A, the sensitivity being greater as the angle A decreases, as may be seen from the formula $$M = T\left(\frac{1}{\sin A} - 1\right)$$

as explained above. If it is desired that the sensitivity of the instrument be further increased, so that a very small increase in the thickness of the strip 14 may be indicated, any suitable indicating device may be substituted for the device 24 illustrated to accurately determine and indicate very small changes in the relative displacement of the frame 20 and the stem 30.

The frame 20 and the parts of the measuring device mounted thereon may be movable manually to any desired position or a supporting and guiding structure therefor may be provided to allow it to be raised and lowered and moved back and forth along the roller 12 throughout the width of the strip. The supporting and guiding structure 50 comprises a rod 52 extending parallel to the axis of the roller 12 between brackets 54 which are secured in any suitable manner to the supporting elements 28. A bracket 56 is slidably mounted on the rod 52 and has a vertically extending pin 58 upon which a lug 60 of the frame 20 is mounted for vertical slidable movement. Thus the frame may be raised and lowered by virtue of the slidable movement provided between the lug 60 and the pin 58, and may be moved horizontally along the width of the strip by virtue of the slidable relation between the rod 52 and the bracket 56.

It will be apparent that I have provided a thickness gauge which shall function to accurately determine the thickness and the changes in thickness of a strip of material at any point through the width of the material while the strip is in motion, which is simple and efficient in operation and which may be inexpensive to manufacture, install and maintain.

In compliance with the requirements of the patent statutes, I have shown and described herein the preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

In a gauge for measuring the thickness of a moving strip of material as it passes over and extends partially around the surface of a rotatable cylindrical member, a frame having two spaced depending members, a contact roller mounted on each of said depending members disposed to engage the sheet material at points spaced a distance less than the sum of the diameter of the cylindrical member and twice the thickness of the material, which points are opposite to points of the strip which engage the cylindrical member and between a diameter of the cylindrical member and the frame, a feeler element, a rotatable contact member mounted on said feeler element, means mounting said feeler element for movement relative to said frame and with said rotatable contact member intermediate said contact rollers and disposed to engage the sheet material, means biasing said feeler element toward the line between said contact rollers, means mounted on said frame for indicating the relative displacement of said feeler element and said frame when said contact rollers and said rotatable contact member are caused to engage the strip of material simultaneously as it passes over the cylindrical member, and guiding and supporting means for said frame comprising means for guiding said frame for movement in a direction substantially normal to the axis of said cylindrical member and means for guiding said frame for movement in a direction substantially parallel to the axis of said cylindrical member.

FINN H. GULLIKSEN.